UNITED STATES PATENT OFFICE

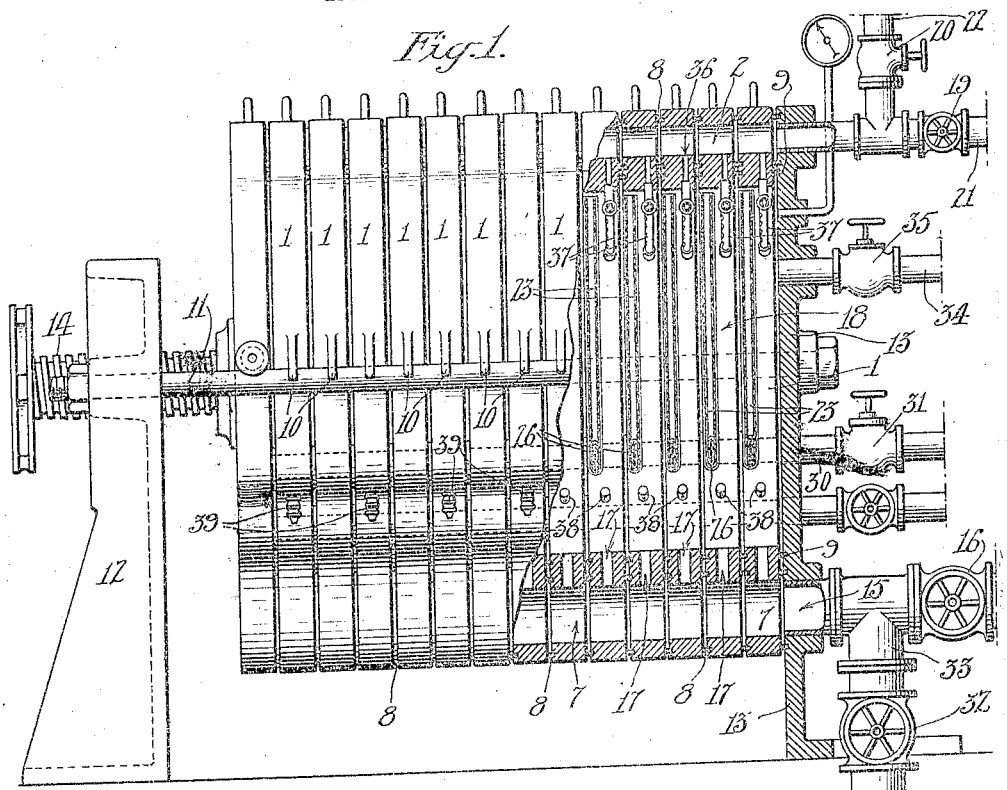

ERNEST J. SWEETLAND, OF GOLDFIELD, NEVADA.

FILTER.

No. 887,285.  Specification of Letters Patent.  Patented May 12, 1908.

Application filed July 22, 1907. Serial No. 385,045.

*To all whom it may concern:*

Be it known that I, ERNEST J. SWEETLAND, a citizen of the United States, residing at Goldfield, in the county of Esmeralda, State of Nevada, have invented a new and useful Filter, of which the following is a specification.

The object of this invention is to effect the filtration or clarification of any liquid carrying solid matter in suspension, and is especially designed for the filtration of slimes from cyanid solution or water in the cyanid process, and for effectively removing the dissolved values from said slimes.

In this specification the term slimes refers to ore in an extremely fine state of division.

The accompanying drawings illustrate the invention and referring thereto: Figure 1 is a side elevation of the filter, a portion being shown in section. Fig. 2 is a detail view in front elevation of a frame partly in section. Fig. 3 is a perspective of a filter device, part being removed, and part being in section.

The filter comprises a series of frames 1 as shown in detail in Fig. 2, each of which has six holes 2, 3, 4, 5, 6 and 7 cast in them, as shown, with annular grooves surrounding said holes which are fitted with gaskets 8. Another annular groove is formed in the body of each frame which receives a gasket 9. Each frame has a pair of hooks or lugs 10 which rest on a pair of horizontal rods 11, the latter being supported by standards 12 and 13. These circular frames 1 are clamped together by a screw 14 threaded in the standard 12 and the holes in each frame registers with the holes in the adjoining frames thus forming six continuous conduits throughout the length of the chamber.

The liquid to be filtered is pumped into conduit 7 through a pipe 15 having a valve 16, and passes from conduit 7 through ports 17 into the main chamber 18. During the time the chamber 18 is filling, the valve 20 is left open to permit the air in the chamber to escape through pipe 22. As soon as liquid appears at the valve 20, showing that all air has been expelled, valve 20 is closed. Suspended in the main chamber 18 is a series of filtering devices 23, each comprising a series of vertical wooden rods 24 surrounded by a wire screen 25, a perforated pipe 26 extends along the bottom of the rods 24 inside the screen, and canvas 27 covers the screen and rods and pipe. The pipes 26 of alternate filtering devices are connected by flexible tubes 28 with nipples 29 communicating with conduit 4. The pipes 26 of the intermediate filter devices are connected by similar tubes 28 and nipples 29 with the conduit 3. Test cocks 39 are provided in each frame which communicate with the respective conduits 3 and 4 and by opening the test cock of a frame it can at once be seen whether the filter device connected with that test cock is leaking. The filters are hung by hooks 40 to the frames and by loosening screw 14 the frame containing the leaky filter may be easily separated from the chamber and the leaky filter removed. The pump (not shown) which is forcing the liquid into the chamber continues to operate, thus forming a pressure against the outside of the filtering devices 23. As the pressure continues the liquid is forced through the canvas down through the spaces between rods 24 of the filtering devices into the perforated pipes 26, which pipes conduct it into the conduits 3 or 4, and from there it is conducted to its proper receptacle through pipe 30 and valve 31. As this process continues, the solid matter contained in the liquid being filtered is deposited upon the canvases of the filtering devices. After a cake of solid matter of say one inch in thickness has formed, the pressure in the chamber has increased to such an extent that it is advisable to remove these cakes before proceeding with filtration. However, before discharging these cakes of residue from the filter it is usually necessary to displace the liquid or cyanid solution in them with wash water, since this liquid in the cyanid process usually contains dissolved values of the precious metals.

A vacuum is applied to the conduits 3 and 4 which prevents the cakes from falling off the filtering devices. While this vacuum is maintained, the valve 32 on the pipe 33 is opened and the remaining liquid allowed to return to the receptacle from which it came, the valve 20 being opened during the emptying of the chamber 18. While this valve is still open, wash water is pumped in through the pipe 33 and valve 32 in the same manner as was the liquid to be filtered. After the chamber is filled with wash water the pump continues to operate and forms a pressure in the chamber and by this pressure forces the wash water through the cakes which adhere to the canvases and the liquid which was contained in them is displaced by water. This being done the barren residues may be removed as follows:—The vacuum on the conduits 3 and 4 is disconnected and instead water or air under pressure is admitted. The result of this is to form a low pressure in the air spaces of the filter devices, which causes the cakes to fall from the filter devices into the lower portion of the main chamber. It will be observed that as every other frame is connected with the conduit 3, and the alternate ones are connected with 4, this arrangement allows the cakes from one-half of the filter devices to be detached at a time so as not to overcrowd the space with residues.

Assuming that the vacuum has been continued on 3 and pressure applied to 4, the cakes will have detached themselves from the filter devices connected with 4 and have fallen into the bottom of the chamber 18. Compressed air is now admitted through the pipe 34 and the valve 35 and valve 16 of the pipe 15 is opened, with the result that the residues in the bottom of chamber 18 are forced through the ports 17 into the conduit 7 and out through the pipe 15 to any convenient point. Having thus cleared the chamber of its residue the cakes attached to the filter devices connected with the conduit 4 are removed in the same manner. At this stage it is advisable to admit water under pressure, through the conduit 2, by means of the pipe 21 and the valve 19, which forces water through ports 36 into the curved perforated pipes 37 which effectually removes any residues which adhere to the filter devices. This having been done water under pressure is admitted through the conduits 5 and 6 which passes through nozzles 38 which forces a series of jets of water into the space 18 which washes the remaining residues down through the ports 17 and out through the conduit 7 and pipe 16. This having been done the entire operation is repeated.

The above description applies especially to the filtration of slimes from cyanid solution and the washing of the same, but the device may be used with equally satisfactory results in the filtration of juice in a sugar factory, or in the filtration of any liquid.

What I claim is:—

1. In a filter, a series of circular frames each having a hollow ear at the bottom, means for holding the frames closely together thereby collectively forming a continuous chamber with a conduit along the bottom, each ear having a port extending to the chamber, and filtering means inside the chamber.

2. In a filter, a series of frames each having a hollow ear at the bottom, means for holding the frames closely together thereby forming a chamber with a conduit along the bottom, each ear having a port extending to the chamber, the frames also having hollow ears on either side of the bottom ears forming side conduits, filtering means in the chamber, and nozzles connected with said side conduits for discharging into the chamber at a point below the filtering means.

3. In a filter, a series of circular frames, each having a hollow ear on the bottom, two hollow ears on each side and a hollow ear at the top, means for holding the frames closely together thereby forming a chamber with a bottom conduit, a top conduit, and two conduits on each side, a curved perforated pipe in the upper part of each frame connected with the top conduit, a filter device hung from each frame, said filter devices having communication with side conduits, and nozzles connected with the other side conduits for discharging into the chamber below the filter devices, the bottom ears having ports extending to the chamber.

4. In a filter, a series of circular frames, each having a hollow ear on the bottom, two hollow ears on each side and a hollow ear at the top, means for holding the frames closely together thereby forming a chamber with a bottom conduit, a top conduit, and two conduits on each side, a curved perforated pipe in the upper part of each frame connected with the top conduit, a filter device hung from each frame, said filter devices having communication with side conduits, nozzles connected with the other side conduits for discharging into the chamber below the filter devices, the bottom ears having ports extending to the chamber, a pipe connected with the top conduit, a valve in said pipe, a branch pipe connected to the latter pipe between the valve and conduit, and a valve in the branch pipe.

5. In a filter, a series of circular frames, each having a hollow ear on the bottom, two hollow ears on each side and a hollow ear at the top, means for holding the frames closely together thereby forming a chamber with a bottom conduit, a top conduit, and two conduits on each side, a curved perforated pipe in the upper part of each frame connected with the top conduit, a filter device hung from each frame, said filter devices having communication with side conduits, nozzles connected with the other side conduits for discharging into the chamber below the filter devices, the bottom ears having ports extending to the chamber, a pipe connected with the top conduit, a valve in said pipe, a branch pipe connected to the latter pipe between the valve and conduit, a valve in the branch pipe, a pipe connected with the bottom conduit and a valve in the pipe, a branch pipe connected to the latter pipe between the valve and bottom conduit, and a valve in said latter branch conduit.

6. In a filter, a series of circular frames, each having a hollow ear on the bottom, two hollow ears on each side and a hollow ear at the top, means for holding the frames closely together thereby forming a chamber with a bottom conduit, a top conduit, and two conduits on each side, a curved perforated pipe in the upper part of each frame connected with the top conduit, a filter device hung from each frame, said filter devices having communication with side conduits, nozzles connected with the other side conduits for discharging into the chamber below the filter devices, the bottom ears having ports extending to the chamber, a pipe connected with the top conduit, a valve in said pipe, a branch pipe connected to the latter pipe between the valve and conduit, a valve in the branch pipe, a pipe connected with the bottom conduit and a valve in the pipe, a branch pipe connected to the latter pipe between the valve and bottom conduit, a valve in said latter branch conduit, pipes connected to the side conduits and valves in the latter pipes.

7. In a filter, a series of circular frames, each having a hollow ear on the bottom, two hollow ears on each side and a hollow ear at the top, means for holding the frames closely together thereby forming a chamber with a bottom conduit, a top conduit, and two conduits on each side, a curved perforated pipe in the upper part of each frame connected with the top conduit, a filter device hung from each frame, said filter devices having communication with side conduits, nozzles connected with the other side conduits for discharging into the chamber below the filter devices, the bottom ears having ports extending to the chamber, a pipe connected with the top conduit, a valve in said pipe, a branch pipe connected to the latter pipe between the valve and conduit, a valve in the branch pipe, a pipe connected with the bottom conduit and a valve in the pipe, a branch pipe connected to the latter pipe between the valve and bottom conduit, a valve in said latter branch conduit, pipes connected to the side conduits, valves in the latter pipes, a pipe communicating directly with the chamber and a valve in said pipe.

8. In a filter, a series of circular frames, each having a hollow ear on the bottom, two hollow ears on each side and a hollow ear at the top, means for holding the frames closely together thereby forming a chamber with a bottom conduit, a top conduit, and two conduits on each side, a curved perforated pipe in the upper part of each frame connected with the top conduit, a filter device hung from each frame, said filter devices having communication with side conduits, nozzles connected with the other side conduits for discharging into the chamber below the filter devices, the bottom ears having ports extending to the chamber, circular gaskets between the frames sealing the joints and circular gaskets between the ears sealing the joints of the conduits.

9. In a filter, a filter device comprising a series of vertical round rods, a perforated pipe along the lower edges of the rods, a wire screen around the rods and pipe, and canvas over the screen, rods and pipe.

10. In a filter, a series of circular frames, each having a hollow ear on the bottom, two hollow ears on each side and a hollow ear at the top, means for holding the frames closely together thereby forming a chamber with a bottom conduit, a top conduit, and two conduits on each side, a curved perforated pipe in the upper part of each frame connected with the top conduit, a filter device hung from each frame, said filter devices having communication with side conduits, nozzles connected with the other side conduits for discharging into the chamber below the filter devices, the bottom ears having ports extending to the chamber, the frames having hooks, horizontal rods engaging the hooks and supporting the frames, and standards supporting the horizontal rods.

11. A filter comprising hollow frames held together to collectively form a continuous filtering chamber, a plurality of said frames having alining openings to form a continuous conduit along said chamber, and a plurality of nozzles communicating with said conduit.

12. A filter comprising hollow frames held together to form a continuous filtering chamber, a plurality of said frames having openings which aline to form a conduit along said chamber, filter devices supported by said frames and having communication with said conduits, another similarly formed conduit extending along the chamber, and nozzles in communication with the latter conduit adapted to discharge a liquid within the chamber.

13. A filter comprising a plurality of hollow frames held together to collectively form a continuous filtering chamber, the frames having alining openings forming a continuous conduit, filter devices in the chamber, and perforated pipes connected to the conduit to project spray on the filter devices.

14. A filter comprising a plurality of hollow frames held together to form a continuous filtering chamber, the frames having alining openings forming a continuous conduit, filter devices in the chamber, and perforated pipes connected to the conduit to project spray on the filter devices.

In testimony whereof, I have hereunto set my hand at Los Angeles, California, this 13th day of July, 1907.

ERNEST J. SWEETLAND.

In presence of
GEORGE T. HACKLEY,
FRANK L. A. GRAHAM.